United States Patent Office 3,277,114
Patented Oct. 4, 1966

3,277,114
N-ETHYL-PYRROLIDINES AND METHOD
OF PREPARATION
Maximilian I. Fremery, Oakland, Calif., assignor to Shell
Oil Company, New York, N.Y., a corporation of Delaware
No Drawing. Filed Nov. 17, 1964, Ser. No. 411,717
15 Claims. (Cl. 260—326.3)

This invention relates to an improved method for the production of certain heterocyclic compounds and to novel products produced thereby. More particularly it relates to certain pyrrolidines possessing a plurality of functional group substituents.

Numerous methods are available in the art for the production of pyrrolidines. These methods include cyclization of α,δ-aminoalcohols, reaction of tetrahydrofurans with ammonia or primary amines, and reduction of pyrroles or succinimides. Such methods may be employed for the production of pyrrolidine derivatives of simple structure, although the attendant disadvantage of requiring a series of synthetic operations and/or economically expensive materials as rectants has precluded the utilization of such procedures on a large scale. Greater difficulty is attendant to the production of pyrrolidines possessing non-hydrocarbyl ring substituents, particularly when pyrrolidines possessing a plurality of non-hydrocarbyl ring substituents are desired. General methods for the production of such poly-substituted pyrrolidines have not heretofore been available.

It is an object of the present invention to provide an improved process for the production of certain substituted pyrrolidines and the novel products obtained thereby. A more particular object is to provide an improved process for the production of novel pyrrolidines possessing non-hydrocarbyl substituents in the 1 and 3 ring positions.

It has now been found that these objects are accomplished by the process of reacting N-(non-hydrocarbyl) aziridine with an activated non-hydrocarbyl olefinic compound at elevated temperature. Under the conditions of the process of the invention, novel pyrrolidine products characterized by the presence of non-hydrocarbyl substituents in the 1 and 3 pyrrolidine ring positions are produced in good yield by an uncatalyzed thermal addition process.

The aziridine reactants which are employed in the process of the invention, alternatively named ethylenimines, are N-ethylaziridines wherein the beta carbon atom of the N-ethyl moiety is substituted with a monofunctional non-hydrocarbyl substituent. By the term "non-hydrocarbyl substituent" as employed herein is meant a functional group containing at least one atom other than carbon and hydrogen, which group is preferably non-acidic, that is, the group is not a carboxylic acid or sulfonic acid group. Illustrative of such non-hydrocarbyl substituents are cyano, carboalkoxy, hydroxy, halogen, halomethyl, carbamyl, mercapto, sulfonylalkyl, acyl, e.g., alkanoyl, and the like. Suitable aziridine reactants are those N-(β-substituted ethyl) aziridines represented by the formula

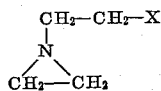

having from 6 to 10 atoms of atomic number greater than 1 wherein X is the non-hydrocarbyl substituent, and the aziridine contains only atoms of oxygen, nitrogen, and halogen, particularly halogen of atomic number from 9 to 35, that is, fluorine, chlorine and bromine, besides atoms of carbon and hydrogen. The non-hydrocarbyl group X therefore contains from 1 to 5 atoms of atomic number greater than 1 and contains only atoms of oxygen, nitrogen, halogen of atomic number from 9 to 35, carbon and hydrogen. A preferred class of X substituents comprises hydroxyl, cyano, carboalkoxy wherein the alkyl moiety is alkyl of from 1 to 2 carbon atoms, carbamyl, and N-alkylcarbamyl wherein the alkyl moiety is alkyl of from 1 to 2 carbon atoms, and halogen of atomic number from 9 to 35. Of these X substituents, a particularly preferred class comprises those X groups having from 2 to 5 atoms of atomic number greater than 1 and containing only atoms of carbon, hydrogen, oxygen and nitrogen wherein the attaching atom, i.e., the atom connecting to the β-(N-aziridinyl)ethyl moiety, is carbon multiply bonded to an atom of atomic number from 7 to 8, e.g., the cyano, carboalkoxy and carbamido groups.

Illustrative of such aziridines are N-(β-hydroxyethyl) aziridine, N-(β-chloroethyl)aziridine, N-(β-cyanoethyl) aziridine, N-(β-fluoroethyl)aziridine, N-(γ-chloropropyl) aziridine, N-(β-carbamylethyl)aziridine, N-(β-carbethoxyethyl)aziridine, N-(β-carbomethoxyethyl)aziridine, and N-[β-(N'-methylcarbamyl)ethyl]aziridine.

These aziridines are conveniently prepared by reaction of ethylenimine with activated olefins or small ring compounds. For example, ethylenimine reacts with ethylene oxide in the vapor phase at temperatures from about 10° C. to about 80° C. to produce N-(β-hydroxyethyl) aziridine as the principal product. Alternatively, ethylenimine undergoes a Michael type addition to ethylenic linkage of activated olefins to produce adducts useful as reactants in the process of the present invention. For example, ethylenimine reacts with acrylonitrile to produce N-(β-cyanoethyl)aziridine and with ethyl acrylate to produce N-(β-carbethoxyethyl)aziridine. Such a process of effecting Michael addition is illustrated by the German Patent No. 849,407, issued September 15, 1952, to Farbwerke Hoechst.

In the process of the invention, the N-(β-substituted ethyl)aziridine is reacted with an activated olefin. By the term "activated olefin" as employed herein is meant an organic compound containing an ethylenic linkage, i.e., a non-aromatic carbon-carbon double bond, the character of which ethylenic linkage has been altered, herein termed activated, by the presence within the molecule of a non-hydrocarbyl substituent. The activated olefins are therefore substituted hydrocarbyl olefins. Although substituted hydrocarbyl olefins wherein the ethylenic linkage in internal are in part operable, best results are obtained when the ethylenic linkage is terminal. One class of such olefins is represented by the formula

wherein Y is a non-hydrocarbyl substituent having no active hydrogen atoms, e.g., cyano, carboalkoxy, halogen, halomethyl, acyl, alkylsulfonyl, alkanoyloxy and the like. Suitable olefins contain from 3 to 8 atoms of atomic number greater than 1 and contain only atoms of oxygen, nitrogen and halogen, particularly halogen of atomic number from 9 to 35, besides atoms of carbon and hydrogen. The non-hydrocarbyl substituent Y therefore contains from 1 to 6 atoms of atomic number greater than 1 and contains only atoms of oxygen, nitrogen, halogen of atomic number from 9 to 35, carbon and hydrogen. A preferred class of such Y groups comprises cyano, carboalkoxy wherein the alkyl moiety is alkyl of from 1 to 3 carbon atoms, and alkanoyloxy wherein the alkane moiety is alkane of from 1 to 3 carbon atoms. Of these Y substituents, a particularly preferred class comprises those groups having from 2 to 5 atoms of atomic number greater than 1 and wherein the attaching atom, i.e., the atom bonded directly to the ethylenic moiety, is carbon multiply bonded to an atom of atomic number from 7 to 8, e.g., Y is cyano or carboalkoxy.

Illustrative of such suitable non-hydrocarbyl substituted olefins are acrylonitrile, ethyl acrylate, methyl acrylate, vinyl fluoride, vinyl chloride, allyl bromide, vinyl acetate, vinyl propionate and allyl chloride.

Without wishing to be bound by any specific theory, it appears that the process of the invention involves thermal cleavage of a carbon-nitrogen bond of the aziridine ring to form a 1,3-diradical and subsequent 1,3-cycloaddition of the diradical thereby produced to the ethylenic linkage of the activated olefin to form the five-membered pyrrolidine ring. In spite of the highly reactive character of free radicals as well as the polymerizable character of olefins under the elevated temperature of the reaction, high selectivity towards the 1,3-cycloaddition process is observed.

The reaction process is conducted at temperatures above that required for aziridine ring cleavage, but below temperatures at which extensive polymerization of the reacting species or the products obtained therefrom is observed. Suitable temperatures vary from about 250° C. to about 500° C., although temperatures from about 300° C. to about 450° C. are preferred.

The efficiency of the production of substituted pyrrolidine is favored by an excess of the olefin reactant whereby the likelihood of olefin "trapping" of the diradical species is increased. The olefin reactant is therefore preferably employed in molar excess over the aziridine. From practical considerations, however, utilization of too great an excess of activated olefin renders process operation and product recovery more difficult due to the large bulk of the reaction mixture. Molar ratios of activated olefin to N-(β-substituted ethyl)aziridine from about 1.5:1 to about 20:1 are generally satisfactory, while molar ratios of from about 2:1 to about 10:1 are preferred.

The process of the invention is conducted in a manner whereby the contact time of the reactants may be controlled, as utilization of too great a reaction time may result in undesirable side reactions. Thus, although batchwise processes are not precluded, it is generally preferred to conduct the process in a continuous manner. In a preferred modification of a continuous reaction process, the reaction is conducted in the vapor phase, as by passing a gaseous mixture of olefin and the aziridine through a reactor maintained at the desired reaction temperature. The reactants are mixed prior to or simultaneously with introduction into the reactor which is customarily tubular in form. In this case of reactants which are normally liquid at or about ambient temperature, it is frequently desirable to employ preheating means to promote extensive vaporization prior to mixing or to introduction into the reactor. Best results are obtained when the reactor is packed with an inert material, e.g., glass helices, to promote more even heat transfer. Customarily the excess of olefin or alternatively an inert gas such as nitrogen, helium, argon, methane or the like is employed as a transfer agent to facilitate passage of the gaseous reactants through the reactor. The reaction is conducted at any convenient pressure, and although superatmospheric or subatmospheric pressures may be employed, the use of reaction pressures that are substantially atmospheric, e.g., from about 0.5 atmosphere to about 2 atmospheres, is preferred. The pressure employed and the rate of reactant introduction largely control the residence time of the reactants in the reaction zone. Residence times from about 0.5 minute to about 10 minutes are typical, although residence times from about 1 minute to about 7 minutes are preferred. Subsequent to passage through the reactor, the effluent is condensed and the product mixture separated by conventional means such as fractional distillation, selective extraction, crystallization or the like.

The products of the invention are pyrrolidines possessing non-hydrocarbyl substituents on the 1 and 3 ring atoms. The products are illustratively produced by cleavage of the aziridine ring and 1,3-cycloaddition of the resulting diradical to the ethylenic linkage of the activated olefin. When the process is conducted employing N-(β-cyanoethyl)aziridine and acrylonitrile as reactants, the process is illustrated by the equation below.

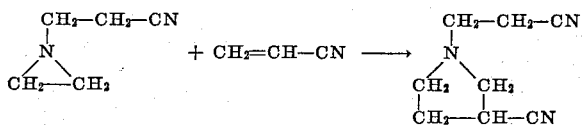

The pyrrolidine products are represented generically by the formula

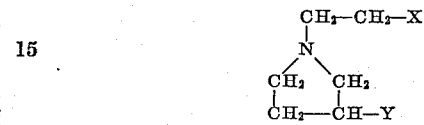

wherein X and Y have the previously stated significance. Exemplary pyrrolidine products include 1-(2-cyanoethyl)-3-cyanopyrrolidine,
1-(2-cyanoethyl)-3-carbethoxypyrrolidine,
1-(2-hydroxyethyl)-3-carbomethoxypyrrolidine,
1-(2-carbamylethyl)-3-acetyloxypyrrolidine,
1-(3-chloropropyl)-3-cyanopyrrolidine,
1-(2-carbethoxy)-3-propionoyloxypyrrolidine,
1-(2-hydroxyethyl)-3-fluoropyrrolidine,
1-(2-chloroethyl)-3-carbomethoxypyrrolidine,
1-(2-carbethoxyethyl)-3-carboethoxypyrrolidine,
1-(1-acetylethyl)-3-cyanopyrrolidine and the like.

The products of the process of the invention find utility as chemical intermediates, particularly in the production of agricultural chemicals, e.g., insecticides and sterilents, and pharmaceutical chemicals. The pyrrolidines are reacted with acids to form useful pyrrolidinium salts or with hydrogen peroxide to produce useful pyrrolidine-N-oxides. The great number of functional groups easily introduced onto the pyrrolidine ring allows the formation of numerous conventional ester, acid, alcohol, amide, ether and amine derivatives. A particular utility for the pyrrolidines of the invention, which arises from the presence of two functional group substituents on the ring, is as precursors for polyesters and polyamides. For example, hydrolysis of 1-(2-carbethoxyethyl)-3-carbethoxypyrrolidine results in the formation of the corresponding dibasic acid which is polymerizable with numerous diamines to form co-polymeric polyamides. Alternatively, hydrolysis of 1 - (2-hydroxyethyl)-3-carbethoxypyrrolidine to the corresponding 3-carboxy derivative produces a hydroxy-acid useful as a monomer in the production of polyesters.

To further illustrate the improved process of the invention and the novel products obtained thereby, the following examples are provided. It should be understood that the details thereof are not to be regarded as limitations as they may be varied as will be understood by one skilled in this art.

Example I

The vapor-phase reactor employed in this and the following examples was a vertically mounted stainless steel tube having an internal diameter of 0.75 inch and a length of about 2 feet. The reactor was equipped with a co-axial thermocouple well and a thermoelectric-controlled heating furnace and was packed with glass helices. To the reactor maintained at 375° C. was introduced 10 g. of N-(β-carbomethoxyethyl)aziridine and 30 g. of methyl acrylate within a 5 hour period. Nitrogen, introduced at a rate of 30–40 cc./min., was utilized as the transport gas. After a residence time of from 2 to 5 minutes, the reaction products were collected in one ice and one Dry Ice trap. Fractional distillation of the condensate gas 9.7 g. of 1-(2-carbomethoxyethyl)-3-carbomethoxypyrrolidine, B.P. 96° C. at 0.1 mm., which represented a yield of 64% based upon a 58% conversion of the aziridine. The mass spectrographic analysis and nuclear magnetic resonance spectrum of the product were consistent with the above formula. The elemental analysis was as follows:

|                    | Anal. Calc. | Found |
|--------------------|-------------|-------|
| C, percent weight  | 55.8        | 55.8  |
| H, percent weight  | 7.9         | 8.0   |
| N, percent weight  | 6.5         | 6.4   |

*Example II*

The procedure of Example I was followed employing a mixture of 10 g. of N-(β-carbomethoxyethyl)aziridine and 20 g. of acrylonitrile. Fractional distillation of the reactor effluent gave 10 g. of 1-(2-carbomethoxyethyl)-3-cyanopyrrolidine, B.P. 115–120° C. at 0.1 mm., which represented a yield of 77% based on a 72% conversion of the aziridine. The mass spectrographic analysis and nuclear magnetic resonance spectrum of the product were consistent with the above formula.

|                    | Anal. Calc. | Found |
|--------------------|-------------|-------|
| C, percent weight  | 59.3        | 59.1  |
| H, percent weight  | 7.7         | 7.7   |
| N, percent weight  | 15.4        | 15.3  |

*Example III*

The procedure of Example I was followed employing a mixture of 10 g. of N-(β-cyanoethyl)aziridine and 22 g. of acrylonitrile. Fractional distillation of the product mixture gave 11.4 g. of 1-(2-cyanoethyl)-3-cyanopyrrolidine, B.P. 130° C. at 0.2 mm., which represented an 81% yield based upon a 74% conversion of the aziridine. The nuclear magnetic resonance spectrum and the mass spectrographic analysis of the product were consistent with the above formula. The elemental analysis was as follows:

|                    | Anal. Calc. | Found |
|--------------------|-------------|-------|
| C, percent weight  | 64.4        | 63.9  |
| H, percent weight  | 7.5         | 7.5   |
| N, percent weight  | 28.1        | 27.6  |

*Example IV*

The procedure of Example I was followed employing a mixture of 10 g. of N-(β-hydroxyethyl)aziridine and 25 g. of acrylonitrile. Fractional distillation of the product mixture gave 7.5 g. of 1-(2-hydroxyethyl)-3-cyanopyrrolidine, B.P. 115° C. at 0.4 mm., which represented a yield of 52% based upon a 46% conversion of the aziridine. The nuclear magnetic resonance spectrum and the mass spectrographic analysis of the product were consistent with the above formula. The elemental analysis was as follows:

|                    | Anal. Calc. | Found |
|--------------------|-------------|-------|
| C, percent weight  | 60.0        | 60.0  |
| H, percent weight  | 8.6         | 8.5   |
| N, percent weight  | 20.0        | 19.8  |

I claim as my invention:

1. The process of producing substituted pyrrolidine by reacting N-(β-X-ethyl)aziridine wherein X represents non-hydrocarbyl substituent selected from cyano, carboalkoxy of up to 3 carbon atoms, hydroxy, halogen, halomethyl, carbamyl, mercapto, alkylsulfonyl of up to 2 carbon atoms and alkanoyl of up to 4 carbon atoms; with the olefin $CH_2=CH-Y$ wherein Y represents non-hydrocarbyl substituent selected from cyano, carboalkoxy of up to 4 carbon atoms, halogen, halomethyl, alkanoyl of up to 5 carbon atoms, alkylsulfonyl of up to 3 carbon atoms and alkanoyloxy of up to 4 carbon atoms; at a temperature from about 250° C. to about 500° C.

2. The process of producing substituted pyrrolidine by reacting N-(β-X-ethyl)aziridine wherein X is selected from the group consisting of hydroxyl, cyano, carboalkoxy wherein the alkyl moiety is alkyl of from 1 to 2 carbon atoms, carbamyl, and N-alkylcarbamyl wherein the alkyl is alkyl of from 1 to 2 carbon atoms; with the olefin $CHC_2=CH-Y$ wherein Y is selected from the group consisting of cyano, carboalkoxy wherein the alkyl moiety is alkyl of from 1 to 3 carbon atoms and alkanoyloxy wherein the alkane moiety is alkane of from 1 to 3 carbon atoms, at a temperature from about 250° C. to 500° C.

3. The process of producing substituted pyrrolidine by reacting N-(β-X-ethyl)aziridine wherein X is selected from the group consisting of hydroxyl, cyano, carboalkoxy wherein the alkyl moiety is alkyl of from 1 to 2 carbon atoms, carbamyl and N-alkylcarbamyl wherein the alkyl moiety is alkyl of from 1 to 2 carbon atoms; with from about 1.5 moles to about 20 moles per mole of aziridine of the olefin $CH_2=CH-Y$ wherein Y is selected from the group consisting of cyano, carboalkoxy wherein the alkyl moiety is alkyl of from 1 to 3 carbon atoms and alkanoyloxy wherein the alkane moiety is alkane of from 1 to 3 carbon atoms; at a temperature of from about 300° C. to about 450° C. and a pressure from about 0.5 atmosphere to about 2 atmospheres.

4. The process of claim 3 wherein said X is hydroxyl and said Y is carboalkoxy wherein the alkyl moiety is alkyl of from 1 to 3 carbon atoms.

5. The process of claim 3 wherein said X is cyano and said Y is carboalkoxy wherein the alkyl moiety is alkyl of from 1 to 3 carbon atoms.

6. The process of claim 3 wherein said X is carboalkoxy wherein the alkyl moiety has from 1 to 2 carbon atoms and said Y is cyano.

7. The process of claim 3 wherein said X is carboalkoxy wherein the alkyl moiety is alkyl of from 1 to 2 carbon atoms and said Y is carboalkoxy wherein the alkyl moiety is alkyl of from 1 to 3 carbon atoms.

8. 1-(2-X-ethyl)-3-Y-pyrrolidines wherein X represents non-hydrocarbyl substituent selected from cyano, hydroxy, halogen, halomethyl, carbamyl, mercapto, alkylsulfonyl of up to 2 carbon atoms and alkanoyl of up to 4 carbon atoms; and Y represents non-hydrocarbyl substituent selected from cyano, carboalkoxy of up to 4 carbon atoms, halogen, halomethyl, alkanoyl of up to 5 carbon atoms, alkylsulfonyl of up to 3 carbon atoms and alkanoyloxy of up to 4 carbon atoms.

9. 1-(2-X-ethyl)-3-Y-pyrrolidines wherein X is selected from the group consisting of hydroxyl, cyano, carbamyl and N-alkylcarbamyl wherein the alkyl is alkyl of from 1 to 2 carbon atoms; and Y is selected from the group consisting of cyano, carboalkoxy wherein the alkyl moiety is alkyl of from 1 to 3 carbon atoms and alkanoyloxy wherein the alkane moiety is alkane of from 1 to 3 carbon atoms.

10. 1 - (2 - hydroxyethyl) - 3-carboalkoxypyrrolidines wherein the alkyl moiety is alkyl of from 1 to 3 carbon atoms.

11. 1 - (2 - cyanoethyl) - 3 - carboalkoxypyrrolidines wherein the alkyl moiety i salkyl of from 1 to 3 carbon atoms.

12. 1 - (2 - carboalkoxyethyl) - 3 - cyanopyrrolidines wherein the alkyl moiety is alkyl of from 1 to 2 carbon atoms.

13. The compound 1-(2-carbomethoxyethyl)-3-cyanopyrrolidine.

14. The compound 1-(2-hydroxyethyl)-3-cyanopyrrolidine.

15. The compound 1 - (2 - hydroxyethyl)-3-carbomethoxypyrrolidine.

References Cited by the Examiner
UNITED STATES PATENTS
2,957,191  3/1961  Wu _____ 260—326.5

ALEX MAZEL, *Primary Examiner.*
HENRY R. JILES, *Examiner.*
JOSEPH A. NARCAVAGE, *Assistant Examiner.*